United States Patent

[11] 3,624,627

| [72] | Inventor | Jack L. Evans<br>10241 La Tuna Canyon Road, Sun Valley, Calif. 91352 |
|---|---|---|
| [21] | Appl. No. | 36,317 |
| [22] | Filed | May 11, 1970 |
| [45] | Patented | Nov. 30, 1971 |

[54] GAS LEAK DETECTION SYSTEM
9 Claims, 1 Drawing Fig.

[52] U.S. Cl. .................................................. 340/242,
73/40.5, 137/79, 137/551
[51] Int. Cl. ................................................ G08b 21/00
[50] Field of Search .......................................... 340/242;
73/40.5, 49.1, 40

[56] References Cited
UNITED STATES PATENTS

| 2,767,392 | 10/1956 | Szwargulski | 340/242 |
| 3,273,753 | 9/1966 | Johnson et al. | 73/40.5 R X |
| 3,304,546 | 2/1967 | Kern et al. | 340/242 |
| 3,350,704 | 10/1967 | Kessler | 340/242 |
| 3,439,837 | 4/1969 | Hearn et al. | 73/40.5 R X |
| 3,516,284 | 6/1970 | Lockard | 73/45.5 R |

Primary Examiner—John W. Caldwell
Assistant Examiner—David L. Trafton
Attorney—Roger A. Marrs

ABSTRACT: A system for sensing the presence of a leak in a closed gas network interconnecting a gas source with a plurality of gas consuming appliances including thermostatic controls for automatically signalling demand to supply the selected appliances. A manual switchover to leak detection means is provided as well as automatic switchback means to appliance-feed operation that bypasses the leak detection circuit when a demand-controlled appliance call for gas, and that switches over to the leak-detection circuit again when the demand ceases. Means are operably coupled in the network to indicate the detection of a leak in the system which may take the form of an alarm involving audible, visual or other attention-attracting media.

PATENTED NOV 30 1971 3,624,627
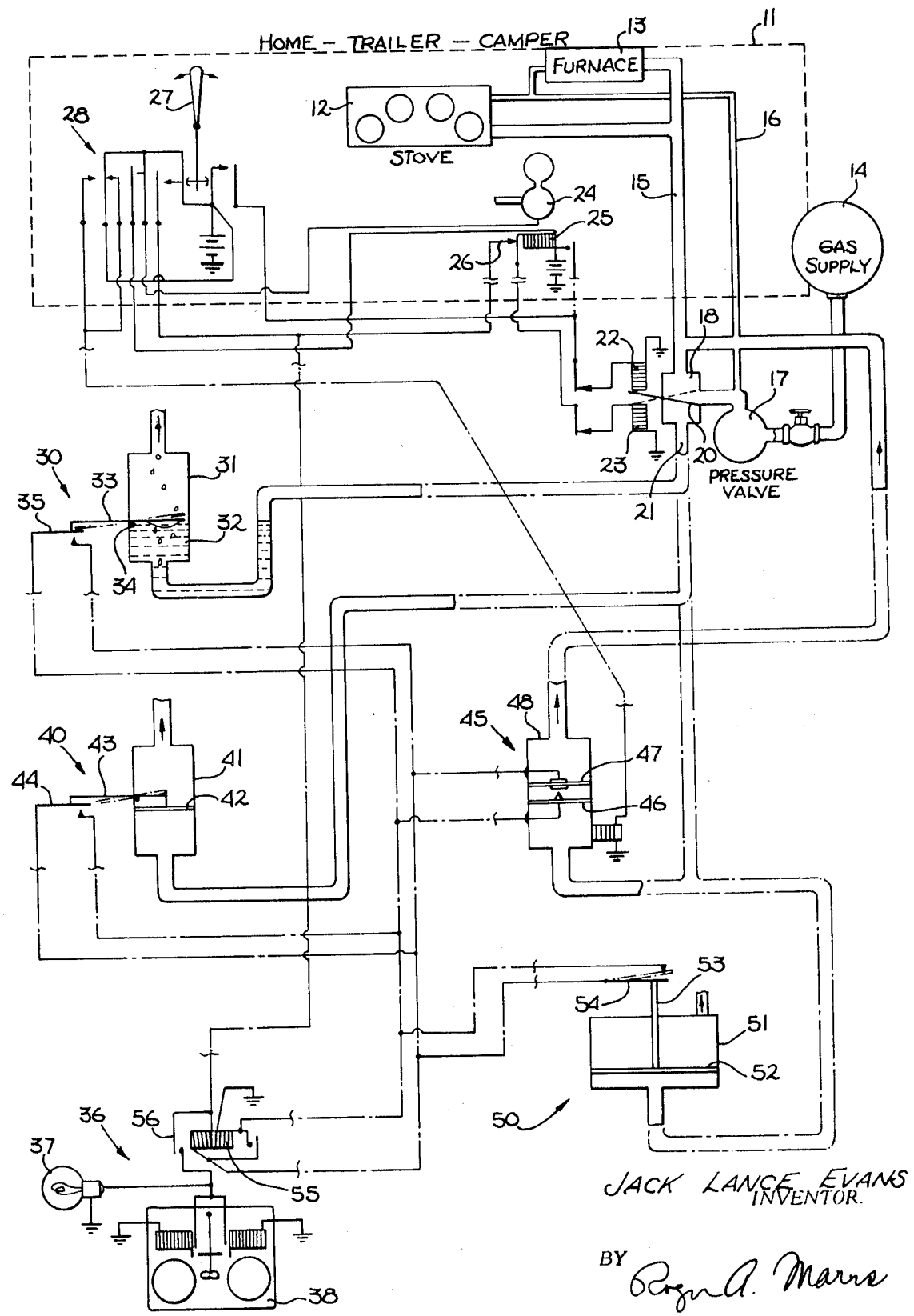
JACK LANCE EVANS
INVENTOR.
BY Roger A. Marrs

GAS LEAK DETECTION SYSTEM

BACKGROUND OF THE INVENTION

1. Field of the Invention

This invention relates to apparatus for detecting leaks in a pressurized gas system and, more particularly, to a novel leak detection means and to a controlling circuit therefor which automatically operates the detection means.

2. Description of the Prior Art

In the past, it has been a conventional practice to employ combustion apparatus such as a furnace, heater, stove or the like, which utilizes a combustible vapor or gas to produce heat energy when properly ignited. In the use of combustible apparatus in which a combustible gas such as natural or liquid propane gas is burned in heating boilers, domestic water heaters, ovens, stoves and the like, the apparatus or appliance is generally of an automatic recycling type. That is to say, the equipment is generally in operation for short periods of time after which is is shut down for a short period of time. The equipment has intermediate operation and the appliance is generally started and stopped at the signal of an automatic controller, such as a thermostat, which may be actuated by temperature, pressure, or the like. This type of appliance is normally unattended by any operating personnel, since it is automatic in operation and, therefore, one hazard encountered in the use of such an appliance is the possibility that during a standby period or a period in which it is not in operation, a gas leak may occur thereby resulting in a large accumulation of combustible gas which can produce an explosion if the detection is not quickly noticed.

Although some prior art monitoring systems or devices have been employed, such as those disclosed in U.S. Pat. Nos. 1,061,598; 1,940,346; and 3,236,284, it is to be particularly noted that these systems do not provide for automatic monitoring of the pressurized gas line or supply while the gas appliances are in a standby condition and which automatically interrupts the monitoring of the system when the appliances in their demand or turned-on condition. Furthermore, the prior art does not include both automatic and manual means for detecting the presence of gas leaks in a pressurized gas system wherein the automatic portion of the combination is under the control of an environmental transducer such as a thermostat. Furthermore, conventional gas detector or monitoring systems fail to include a variety of alarms or signalling means which will alert persons to the existence of a dangerous leak. Although some sophisticated detector means have been provided, it is contemplated that the indicator means should be simple and economical so that the entire system may be readily incorporated into mobile trailers, campers, boats and other vehicles or living quarters having appliances dependent upon storage of pressurized gas.

SUMMARY OF THE INVENTION

Accordingly, the problems and difficulties encountered with conventional gas leak detectors and monitoring systems are obviated by the present invention which provides a gas leak monitoring system detachably coupled into the source of pressurized gas for selectively conducting a sample of the pressurized gas to detection and indicating means. The detection and indicating means are responsive to the presence of air or other foreign matter in the pressurized gas supply which is generally of a lighter weight than the gas so as to rise above a liquid level which is visibly presented to an observer. Additionally, means may be provided in the indicating means for signalling the observer, such as by including diaphragms, pivoting members or other movable elements adapted to move in response to the presence of air bubbles or accumulations. Control means are provided for selectively coupling the detection system into the pressurized gas line which may take the form of a thermostat or other environmental transducers so that the detection means will be operative during the standby operation of appliances and will not be operative during the demand operation of the appliances.

Therefore, it is among the primary objects of the present invention to provide a novel means for safely detecting any malfunction of a pressurized gas system in order to prevent accumulation of combustible gases so that damage or explosion due to such an accumulation of gases is prevented.

Another object of the present invention is to provide a novel safety means for detecting the leakage of gas into the area of an appliance when the appliance is in a shutdown condition and not in operation.

It is another object of the present invention to provide a novel monitoring system for a gas-fired appliance which includes a means for automatically coupling into the pressurized gas supply line a detection system or means for determining and indicating the presence of gas leaks while selectively decoupling the detection system from the supply line when the appliances are in their proper operation.

Yet another object of the present invention is to provide a novel gas detection and monitoring system which is economical to manufacture and which may be readily installed in conventional trailers, boats or the like which are normally dependent upon a stored supply of pressurized gas.

It is a further object of the present invention to provide a novel combination of manual switchover to leak detection and automatic switchback to appliance-feed operation when a demand requires gas and which switches over to the leak-detection circuit again when the demand ceases.

BRIEF DESCRIPTION OF THE DRAWING

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

The diagrammatic illustration in the drawing shows the pressurized gas line monitoring system and the detection system of the present invention. The detection system is illustrated to show four different embodiments of devices for sensing and activating visual or audible alarms.

DESCRIPTION OF THE PREFERRED EMBODIMENTS

Referring to detail to the drawing, a mobile home, trailer, camper, boat or other type of living enclosure is illustrated within the confines of the broken lines indicated by numeral 11. The structure 11 includes such conventional gas appliances as a stove 12 and a furnace 13. The stove and furnace are fixedly connected to a pressurized gas supply 14 via a gas pipe 15 which is connected in parallel to the appliances. A suitable pilot gas pipe 16 is coupled to a pressure valve 17 between the pipe 15 and supply 14. The pressure valve 17 not only supplies the pilot pipe 16 with gas but is in fluid communication with a double-solenoid operated valve 18. The valve 18 includes a pivoted flapper or blade 20 which, as shown in its solid line position, connects the pressure valve 17 to the conduit or pipe 15. However, in its broken line configuration, valve 17 is connected to a pipe or conduit 21 leading to the detector and indicator means, to be described hereinafter.

The double-solenoid valve 18 includes solenoids 22 and 23 which are selectively energized by means of a thermostat control 24 operable in response to environmental conditions, such as temperature, for example. Thermostat 24 is operably connected to a solenoid 25 so that when a preset condition exists, a switch contact 26 operates a selected one of the solenoids 22 and 23 so that the flapper 20 is disposed in a predetermined condition.

The solenoids of valve 28 are further operated by means of a manual switch 27 which arranges selected ones of contacts in a switch 28 so as to set the flapper 20 in a selected one of its alternate positions. By this mans, it can be seen that pressurized gas may be maintained solely in conduit 15, such as when the appliances are in demand of the gas and therefore are in their operating condition or, when the flapper valve 20 is in its alternate position, the pressurized gas is blocked from the appliances and diverted to the detecting and indicating means. This latter position occurs when the appliances are in their standby condition. Again, this may be achieved by actuating switch handle 27 to set the contacts of switch 28 so that current and voltage is supplied to appropriate solenoids 22 or 23.

In one form of the invention, the sensing and indicator means connected to conduit or pipe 21 is indicated in the general direction of arrow 30 and includes a cylindrical chamber 31 which is partially filled with a fluid, such as water 32, for example. Pivotally disposed within the cavity of chamber 31, there is provided a lever 33 which is mounted midway between its opposite ends on pivot 34. The portion of the lever within the cavity is arranged to rest on the surface of water 32 and is preferably cup-shaped as opposed to being flat. As air or gas bubbles appear in the water 32 which are indicative of a gas leak, the bubbles rise through the liquid and collect beneath the lever 33. When sufficient pressure has accumulated, the lever will pivot in a counterclockwise direction so as to actuate and close switch contact 35. This normally opens switch contact and completes an electrical circuit to an alarm as indicated in the general direction of arrow 36. The alarm may take the form of a visual bulb 37 or an audible alarm as may be represented by the buzzer 38.

Another embodiment is illustrated in the direction of arrow 40 which includes a chamber 41 having a piston or movable diaphragm 42 slidably carried therein and which includes a pointer or post on one side thereof. As pressure builds beneath the diaphragm 42 in response to the presence of a gas leak, the piston or diaphragm 42 sill move upwardly so that the pointer or post strikes against lever 43 which pivots the lever to close switch contact 44. Again, the closure switch contact 44 will actuate either the buzzer or the lamp.

Still another embodiment of the indicator or sensing means is illustrated in the direction of arrow 45 which includes a movable diaphragm 46 having a contact on one side thereof and electrically connected to the circuit of the lamp and/or buzzer alarm. A fixed or stationary diaphragm 47 is supported within the chamber 48 and includes centrally disposed contacts adapted to be mated with the contacts on the movable diaphragm 46. The contacts carried on diaphragm 47 are electrically connected to the alarm circuit. Therefore, as pressure builds up beneath the movable diaphragm 46, the diaphragm will move in the direction of the diaphragm 47 and the contacts of the two diaphragms will mate to energize the alarm circuit.

A further embodiment of an indicator and detector means is illustrated in the direction of arrow 50 which includes a chamber 51 having a movable diaphragm 52 slidably carried therein. Diaphragm 52 includes an elongated post 53 which projects outside of the housing for the chamber 51. This is a substantial difference from the construction of the device shown in the direction of arrow 40. The post 53 is in alignment with contacts 54 so that when the diaphragm moves upwardly, the post will close the normally open contact 54 to complete the electrical circuit to the alarm.

A solenoid is associated with the chamber 51 that is operated by a contact in the switch 28 so that pressure may be relieved from the chamber to return diaphragm 46 after it has moved upwardly. The solenoid is operable to vent the lower part of the chamber when energized by the contact closure of switch 28.

It is to be noted that transducer means 30, 40, 45 and 50 are connected to conduit 15 via return lines indicated by arrows at the upper portions of the respective chambers. Such an arrangement provides proper and adequate pressure balance between conduits 15 and 21. A feature of the invention resides in the fact that when a leak occurs in the appliance gas lines or at any point beyond valve 18, then the pressure reduces in conduit or pipe 15 which allows gas in pipe 21 to flow for actuating the detector unit or transducer means.

With respect to the alarm shown in the direction of arrow 36, it is noted that the bulb 37 and the buzzer 28 are connected in parallel so as to be turned on simultaneously upon the energization of a control circuit including solenoid 55. The solenoid 55 is electrically coupled to any one of the sensing devices 30, 40, 45 or 50 and when energized, closes contact 56 to complete the electrical circuit to the lamp and buzzer. In addition to the audible and illuminated alarm 36 and 38, it is to be understood that other visual indication may be achieved, such as by employing windows in the housings 31, 41, 48 and 51 so that a displacement of the respective levers or diaphragms may be visually observed.

Therefore, it can be seen that either the manual switch 27–28 or the thermostat 24 may place into operation the monitoring and indicating system so that gas leaks in the pressurized supply may be detected. Also, once a leak has been detected, means are provided for sounding an alarm or for taking corrective action such as isolating the gas supply from the appliances. The inventive concept includes a novel combination of manual switchover to leak detection and automatic switchback to appliance-feed operation (temporarily cutting out the leak detection circuit) when a demand-controlled appliance calls for gas, and switches over to the leak-detection circuit again when demand ceases.

It is to be noted that the battery associated with solenoid 25 operates the solenoid 22 when solenoid 25 is energized by the thermostat. When energized, the contact on the left-hand side breaks and the contact on the right-hand side closes. This action directs the gas into conduit 15. Solenoid 23 is energized by the battery associated with switch 28 which directs the gas into pipe 21.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A gas monitoring and detection system comprising:
   a source of pressurized gas;
   a plurality of gas-operated applicances;
   a conduit connecting each of said appliances to said gas source;
   electrical valve means operably coupled in said conduit between said gas source and said appliances for selectively interrupting gas flow through said conduit;
   gas leak alarm means connected to said conduit via said valve means; and
   transducer means connected to said valve means for directing the gas flow to said appliances or to said alarm means in response to selected ambient environmental conditions.

2. The invention as defined in claim 1 including
   a manually operated switch means operably connected to said valve means in parallel to said transducer means for independent manual testing of the gas flow for leaks.

3. The invention as defined in claim 1 wherein
   said electrical valve means comprises a solenoid-operated valve including a flapper disposed in said conduit for directing the gas flow to said appliances or to said transducer means.

4. The invention as defined in claim 3 wherein
   said transducer means includes an enclosed chamber partially filled with a liquid; and
   a lever arm pivotally carried on said chamber so as to be disposed on the surface level of said liquid and being pivotal in response to the presence of gas bubbles in the liquid to actuate an alarm circuit.

5. The invention as defined in claim 3 wherein
   said transducer means includes an enclosed chamber including a diaphragm movably carried therein in response to the presence of gas pressure to close electrical contact means to actuate an alarm circuit.

6. The invention as defined in claim 4 wherein
said transducer means includes visual means for indicating the presence of gas pressure.
7. The invention as defined in claim 3 wherein
said transducer means comprises a thermostat operably connected to said valve means so as to disable said valve means for directing gas flow to said alarm means when said thermostat operates in response to a predetermined ambient temperature to supply gas to said appliances.
8. The invention as defined in claim 7 wherein
said valve means includes a pair of solenoid operated contacts selectively closable to effect direction of said gas flow to said applicances or to said alarm means; and
a selected one of said solenoids operative to effect appliance operation to the exclusion of said alarm means and said other solenoid operative to effect detection of gas bubbles.
9. The invention as defined in claim 8 including
conduit means interconnecting said transducer to said first-mentioned conduit acting as a return pressure line for the gas supply system.

* * * * *